(12) United States Patent
Imafuku

(10) Patent No.: US 12,251,704 B2
(45) Date of Patent: Mar. 18, 2025

(54) SHREDDER SYSTEM

(71) Applicant: Realize Company Inc., Tokyo (JP)

(72) Inventor: Yosuke Imafuku, Tokyo (JP)

(73) Assignee: Realize Company Inc., Tokyo (JP)

( * ) Notice: Subject to any disclaimer, the term of this patent is extended or adjusted under 35 U.S.C. 154(b) by 241 days.

(21) Appl. No.: 17/916,373

(22) PCT Filed: Apr. 1, 2021

(86) PCT No.: PCT/JP2021/014204
§ 371 (c)(1),
(2) Date: Sep. 30, 2022

(87) PCT Pub. No.: WO2021/201241
PCT Pub. Date: Oct. 7, 2021

(65) Prior Publication Data
US 2023/0149938 A1 May 18, 2023

(30) Foreign Application Priority Data

Apr. 1, 2020 (JP) ................................. 2020-065601

(51) Int. Cl.
*B02C 18/00* (2006.01)
(52) U.S. Cl.
CPC .. *B02C 18/0007* (2013.01); *H04N 2201/3246* (2013.01); *H04N 2201/3295* (2013.01)
(58) Field of Classification Search
CPC .................................................. B02C 18/0007
See application file for complete search history.

(56) References Cited

U.S. PATENT DOCUMENTS

| | | | |
|---|---|---|---|
| 2006/0285147 A1* | 12/2006 | Wolfman | H04N 1/32122 358/1.14 |
| 2009/0106249 A1* | 4/2009 | Saito | H04N 1/4426 707/999.009 |
| 2010/0044482 A1* | 2/2010 | Hirasuga | B02C 18/0007 241/34 |

FOREIGN PATENT DOCUMENTS

| | | |
|---|---|---|
| JP | H10-249228 A | 9/1998 |
| JP | 2002342329 A | 11/2002 |

(Continued)

OTHER PUBLICATIONS

Extended European Search Report issued in European Application No. 21779424.7, dated Dec. 1, 2023 (6 pages).

(Continued)

*Primary Examiner* — Jared O Brown
(74) *Attorney, Agent, or Firm* — Osha Bergman Watanabe & Burton LLP

(57) ABSTRACT

A read unit of a scanner device reads the information fixed to a medium by printing. A transmission control unit executes the control of transmitting, to a server, the information of the medium acquired in the form of digital image data. An information acquisition unit acquires the information transmitted from a shredder. An information management unit stores the information acquired by the information acquisition unit in an acquired information database in such a way as to be identified as the information of the medium so as to be managed to be capable of being read out as the information of the medium. An information readout unit acquires a readout indication transmitted from an observer terminal. Then, the information readout unit reads the information of the medium out of the acquired information database via the information management unit.

3 Claims, 6 Drawing Sheets

(56) References Cited

FOREIGN PATENT DOCUMENTS

| | | |
|---|---|---|
| JP | 2003-062476 A | 3/2003 |
| JP | 2009-165921 A | 7/2009 |
| JP | 2010-046619 A | 3/2010 |
| JP | 2011-097157 A | 5/2011 |
| JP | 2020-015027 A | 1/2020 |

OTHER PUBLICATIONS

Office Action issued in Japanese Application No. 2022-093019, mailed Mar. 26, 2024 (5 pages).
International Search Report issued in Application No. PCT/JP2021/014204 mailed on Jun. 29, 2021 (4 pages).
Written Opinion issued in Application No. PCT/JP2021/014204 mailed on Jun. 29, 2021 (3 pages).
Office Action issued in the counterpart Chinese Application No. 202180029270.3, mailed Aug. 5, 2023 (13 pages).
Wang Xincai et. al.: "Archives Information Resources Management Based on Business Rules" Wuhan University Press, 1st Edition, Jun. 2014, pp. 169-172 (68 pages).

\* cited by examiner

SHREDDER SYSTEM

TECHNICAL FIELD

The present invention relates to a shredder system.

BACKGROUND ART

There are a number of known conventional technologies related to shredders (see, for example, Patent Document 1).
Patent Document 1: Japanese Unexamined Patent Application, Publication No. 2020-15027

DISCLOSURE OF THE INVENTION

Problems to be Solved by the Invention

However, the conventional technologies including the technology disclosed in Patent Document 1 are insufficient, and it has been difficult to recover information fixed on a medium, which is an object to be shredded, after the medium has been fed into a shredder.

The present invention was achieved in consideration of the above-described circumstances and an object thereof is to recover information fixed on a medium that has been fed into a shredder.

Means for Solving the Problems

In order to achieve the object described above, a shredder system according to an aspect of the present invention includes:
  an information processing device;
  a shredder configured to shred a medium having information fixed thereon; and
  a scanner device,
  the scanner device being configured to read the information fixed on the medium at a predetermined time before the medium is shredded by the shredder,
  the information processing device including
  an information acquisition section configured to acquire the information read by the scanner device and
  an information management section configured to manage the information acquired by the information acquisition section in a recoverable manner.

Effects of the Invention

According to the present invention, it is possible to recover information fixed on a medium that has been fed into a shredder.

PREFERRED MODE FOR CARRYING OUT THE INVENTION

First Embodiment

The following describes a first embodiment of the present invention with reference to the drawings.

First, referring to FIG. 1, the following describes an overview of a service (referred to below as "the present service") to which a shredder system (see FIG. 2 described below) according to the present invention is applied.

Figure 1:
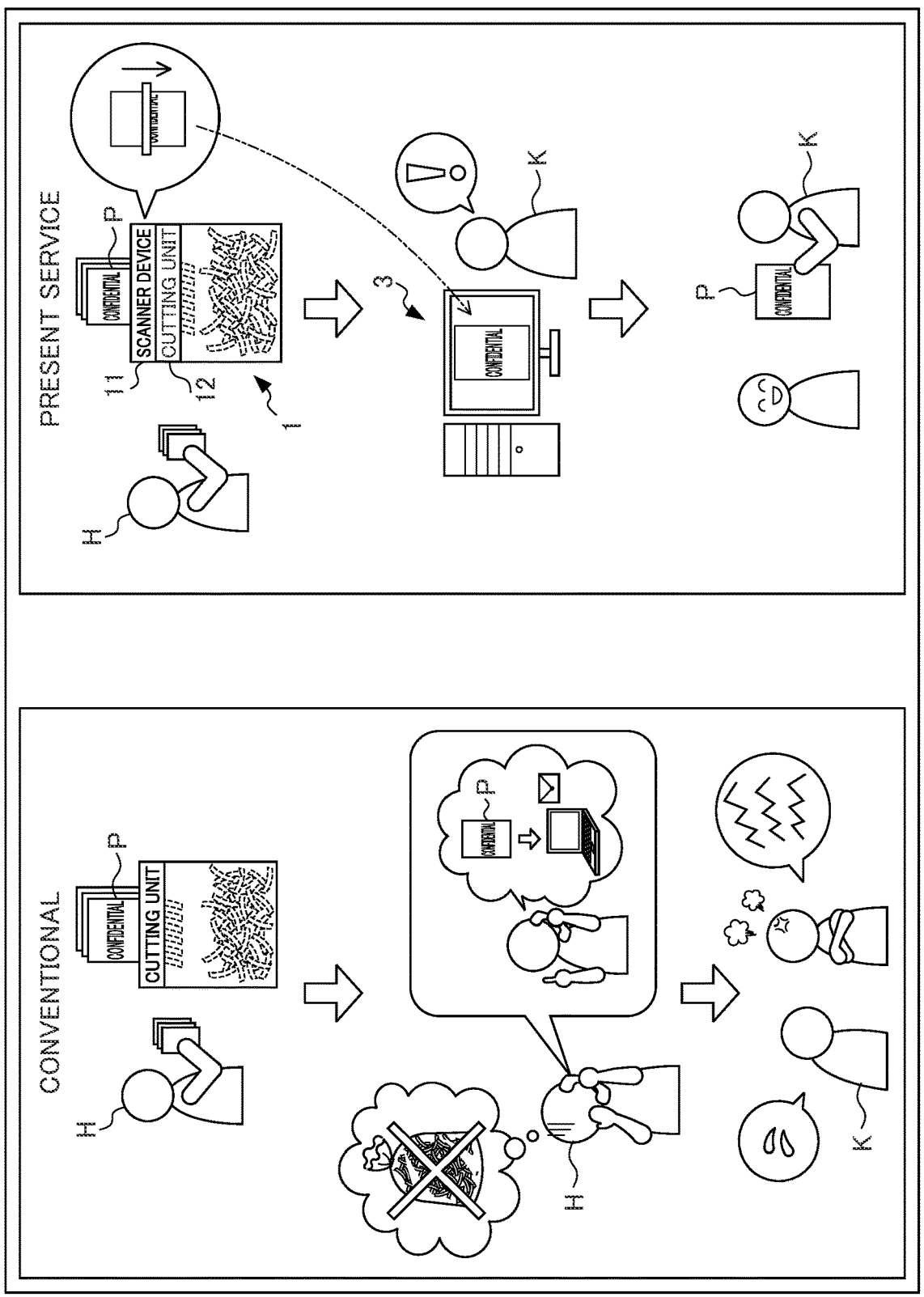
FIG. 1 is a diagram illustrating an overview of an example of a present service that can be implemented through a shredder system according to an embodiment of the present invention, versus a conventional service.

FIG. 1 is a diagram illustrating an overview of an example of the present service that can be implemented through a shredder system according to an embodiment of the present invention, versus a conventional service.

The present service is, for example, provided to a user K who works in an office or the like and who is in a position to manage a worker H. Specifically, for example, the present service is offered to recover information fixed on a medium P that should not be discarded due to its nature and to provide the recovered information to the user K, in a situation in which the worker H has shredded the medium P using a shredder without permission and the information fixed on the medium P has been destroyed.

Conventionally, confidential information is printed or otherwise fixed on a medium P such as paper for use in an office or the like. When the medium P is no longer needed, therefore, a shredder technology is used to shred the medium P, and thus make the confidential information indeterminable in order to prevent a non-related party from determining and appropriating the confidential information fixed on the medium P. The shredder technology allows for protection of privacy and prevention of information leakage by shredding the medium P, but is characterized by the fact that it is extremely difficult to recover the shredded medium P. As such, a shredder is used for the purpose of protecting privacy or preventing information leakage, but not infrequently, is also intentionally used for the purpose of destroying information by someone who does not want the medium P to be recovered.

Specifically, in a case where a medium P has printed thereon information about a contract with a client and somehow makes against the worker H (for example, proves the worker's failure) in an office or the like, the worker H may want to keep the medium P from coming to the attention of the user K, who is his/her supervisor. The following therefore considers a case where the worker H destroys the medium P on purpose. In this case, however, the medium P is treated as do-not-discard, because the medium P contains information about a contract with a client, and is therefore an important document to the office or the like (especially to the user K). For example, assume that the worker H himself/herself has accidentally soiled the medium P. In order to avoid being accused by the user K of soiling the medium P, the worker H attempts to conceal his/her failure by destroying the medium P that proves his/her failure. That is, the worker H shreds the soiled medium P using a shredder that is not capable of information recovery to erase the medium P from existence. As a result of the medium P being thus destroyed, the information printed or otherwise fixed on the medium P is also destroyed. With the conventional technology, the user K has no way to notice that the medium P (i.e., the information fixed on the medium P) has been destroyed by the worker H. The medium P is therefore found to have been destroyed only when someone tries to reuse the information printed on the medium P at a later date, making the problem worse.

Furthermore, not infrequently, one can shred a medium P not on purpose but by mistake, although not shown. As mentioned above, the shredder technology is characterized by the fact that it is extremely difficult to recover the shredded medium P. A careful confirmation is therefore necessary as to whether or not it is really all right to discard the medium P before the medium P is fed into a shredder. However, in an office or the like where a large amount of medium are handled, it is complicated and difficult due to time constraints to accurately confirm whether or not it is really all right to discard the medium P each time a medium P is fed into a shredder. It is therefore not uncommon to feed into a shredder a medium P that should be treated as do-not-discard due to its nature and destroy information fixed thereon by mistake.

To solve the problems of the conventional technology shown on the left side of FIG. 1, the present service shown on the right side of FIG. 1 makes it possible to recover the information fixed on the medium P even after the medium P has been shredded using a shredder 1. Specifically, for example, even if the worker H feeds the medium P into the shredder 1 on purpose or by mistake, a series of processes described below is performed. Specifically, the medium P is scanned by a scanner device 11 provided within the shredder 1 before being shredded, and thus the information fixed on the medium P is read. The read information is transmitted to and stored in a server 2, which is described below with reference to FIG. 2. Thus, the information fixed on the medium P that has been fed into the shredder 1 is saved in the server 2 before the medium P is shredded. The medium P is sent to a cutting unit 12 and shredded after the information fixed thereon has been read by the scanner device 11. The user K searches for and extracts the information of the medium P stored in the server 2 using a supervisor terminal 3. As described above, the user K can recover the information destroyed as a result of the worker H feeding the medium P into the shredder 1.

Figure 2:
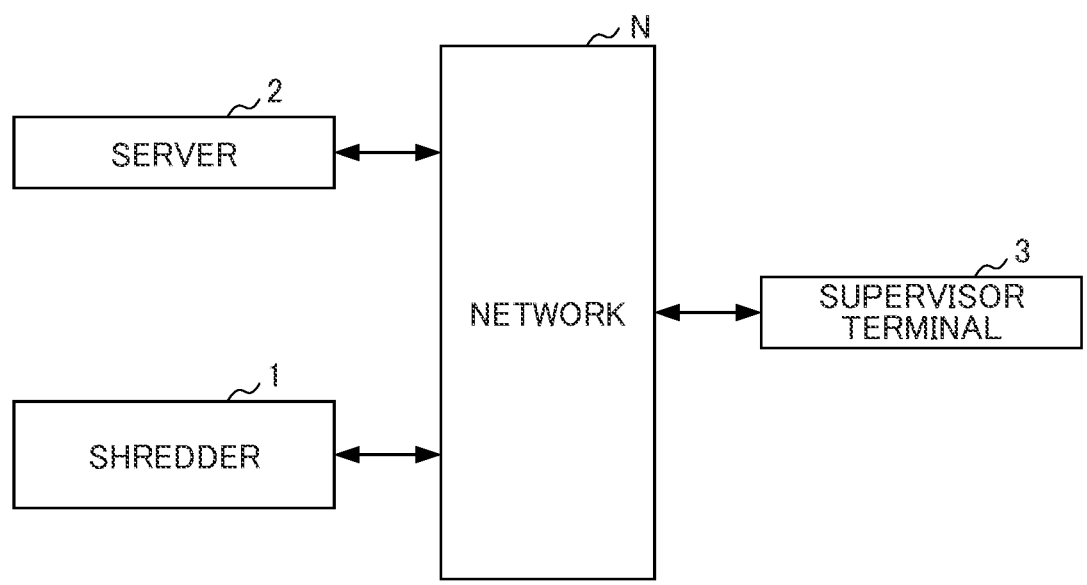
FIG. 2 is a diagram illustrating a system configuration of the shredder system according to the embodiment of the present invention.

In the foregoing, an overview of the present service to which the shredder system according to the present invention is applied has been described with reference to FIG. 1. FIG. 2 is a diagram illustrating a system configuration of the shredder system according to the embodiment of the present invention.

The shredder system illustrated in FIG. 2 includes the shredder 1, the server 2, and the supervisor terminal 3. The shredder 1, the server 2, and the supervisor terminal 3 are connected to each other via a predetermined network N such as the Internet. No particular limitations are placed on the form of the network N, and examples of usable networks include Bluetooth (registered trademark), Wi-Fi, a local area network (LAN), and the Internet.

The shredder 1 is, for example, installed in an office or the like and is operated by the worker H and others.

The server 2 is, for example, an information processing device that is managed by a system administrator (not shown) under the supervision of the user K. The server 2 executes various processes while communicating with the shredder 1 and the supervisor terminal 3 as appropriate. No particular limitations are placed on who performs duties as the system administrator. For example, the user K himself/herself may perform the duties as the system administrator.

The supervisor terminal 3 is an information processing device that is installed in the office or the like and operated by the user K. Specifically, the supervisor terminal 3 includes, for example, a personal computer, a smartphone, or a tablet.

Figure 3:
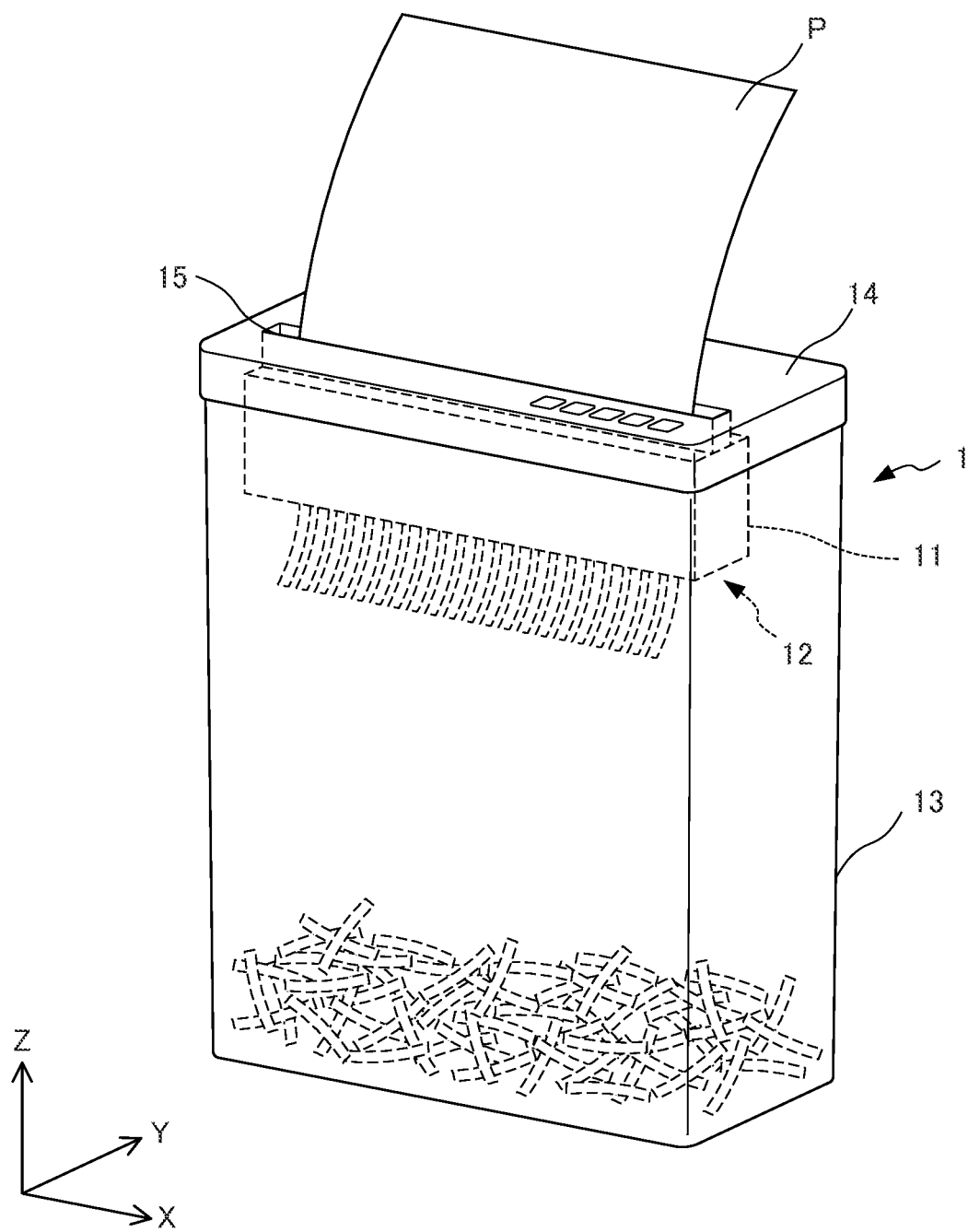
FIG. 3 is a perspective view of an example of an external configuration of a shredder in the system configuration of the shredder system according to the embodiment of the present invention.

Referring now to FIG. 3, the following describes an example of a hardware configuration of the shredder 1 that forms the shredder system described above. FIG. 3 is a perspective view of an example of an external configuration of the shredder in the system configuration of the shredder system according to the embodiment of the present invention. As shown in FIG. 3, the shredder 1 is placed on a plane (XY plane) formed by an X axis and a Y axis shown in FIG. 3. Accordingly, an X axis direction is referred to below as a "length direction", a Y axis direction as a "width direction", an upward direction along a Z axis in FIG. 3 as an "up direction", and a downward direction along the Z axis in FIG. 3 as a "down direction".

As shown in FIG. 3, the shredder 1 includes the scanner device 11, the cutting unit 12, a housing unit 13, and a top panel unit 14. The top panel unit 14 is attached to an upper portion of the housing unit 13. The top panel unit 14 has a feed opening 15 for feeding a medium P. The scanner device 11 is provided within the housing unit 13 and is located right under the feed opening 15 provided in the top panel unit 14. The scanner device 11 reads information printed or otherwise fixed on a medium P and converts the read information into digital image data. Specifically, the scanner device 11 reads information fixed on a medium P with an automatic document feeder (not shown) transferring the medium P. The scanner device 11 then converts the read information into digital image data and outputs the converted information to an external destination.

The cutting unit 12 is provided within the housing unit 13 and is located under the scanner device 11. The cutting unit 12 shreds the medium P that has been transferred thereto by the scanner device 11 (automatic document feeder) with fine blades.

Specifically, the medium P is fed into the shredder 1 through the feed opening 15, and then sent to the scanner device 11. The information fixed on the medium P is read by the scanner device 11, converted into digital image data, and then transmitted to the server 2. Thereafter, the medium P is transferred from the scanner device 11 to the cutting unit 12 and shredded.

Figure 4:
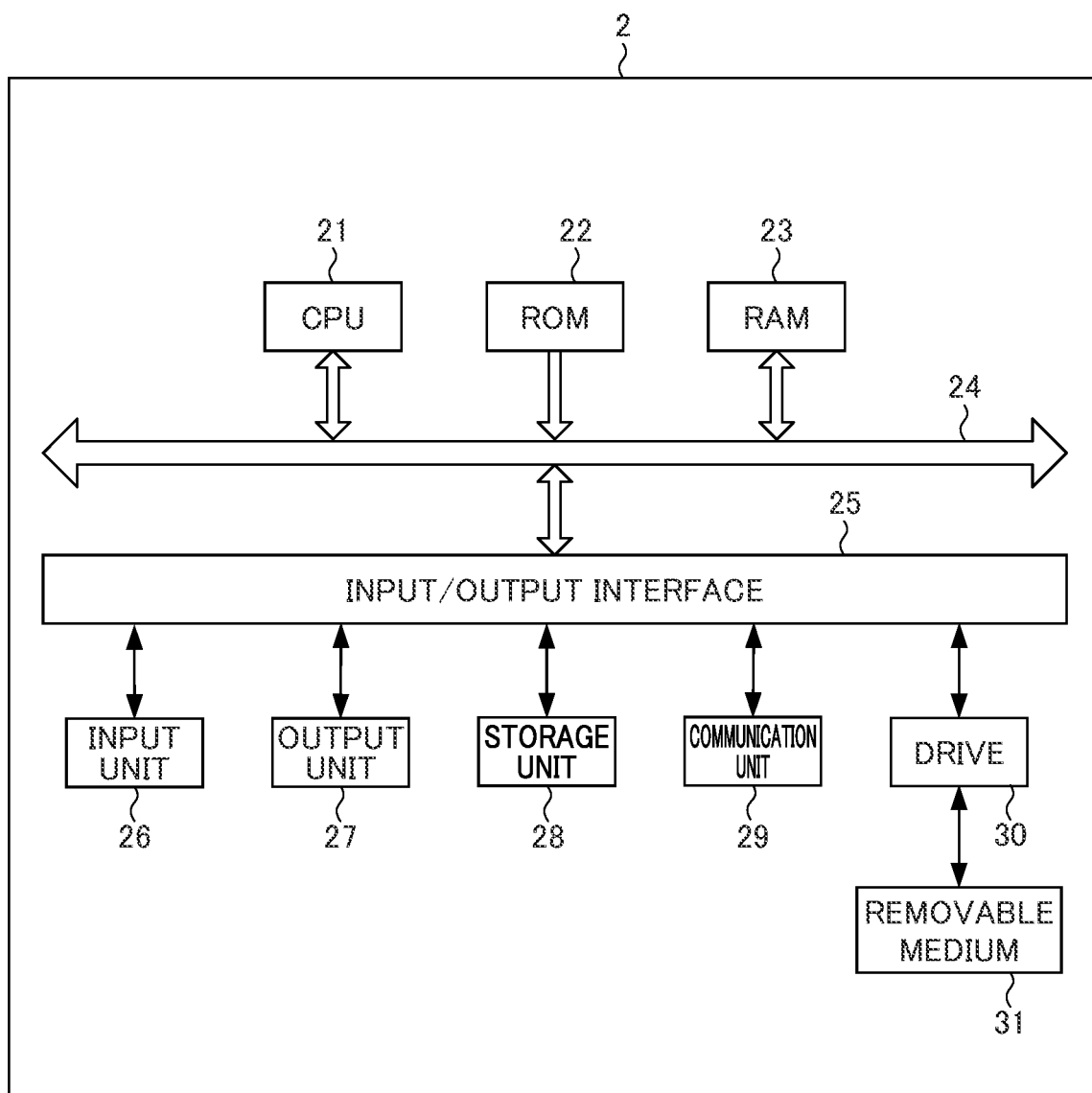
FIG. 4 is a block diagram illustrating a hardware configuration of a server in the shredder system according to the embodiment of the present invention.

Referring now to FIG. 4, the following describes an example of a hardware configuration of the server 2 that forms the shredder system described above. FIG. 4 is a block diagram illustrating the hardware configuration of the server in the shredder system according to the embodiment of the present invention.

The server 2 includes a central processing unit (CPU) 21, read only memory (ROM) 22, random access memory (RAM) 23, a bus 24, an input/output interface 25, an input unit 26, an output unit 27, a storage unit 28, a communication unit 29, and a drive 30.

The CPU 21 executes various processes in accordance with programs recorded in the ROM 22 or programs loaded from the storage unit 28 into the RAM 23. Data necessary for the CPU 21 to execute the various processes, for example, is also stored in the RAM 23 as appropriate.

The CPU 21, the ROM 22, and the RAM 23 are connected to each other via the bus 24. The input/output interface 25 is also connected to the bus 24. The input unit 26, the output unit 27, the storage unit 28, the communication unit 29, and the drive 30 are connected to the input/output interface 25.

The input unit 26 includes, for example, a keyboard and receives input of various information. The output unit 27 includes, for example, a speaker and a display such as a liquid crystal display. The storage unit 28 includes, for example, dynamic random access memory (DRAM) and stores therein various data. The communication unit 29 communicates with other devices (for example, the shredder 1 in FIG. 3) via the network N including the Internet.

A removable medium 31 including, for example, a magnetic disk, an optical disk, a magneto-optical disk, or semiconductor memory is attached to the drive 30 as appropriate. A program retrieved from the removable medium 31 by the drive 30 is installed in the storage unit 28 as needed. The removable medium 31 can store therein the various data stored in the storage unit 28 in the same manner as in the storage unit 28.

Although not shown, the supervisor terminal 3 in FIG. 2 may have basically the same configuration as the hardware configuration of the server 2 shown in FIG. 4. Description of the configuration of the supervisor terminal 3 is therefore omitted.

Figure 5:
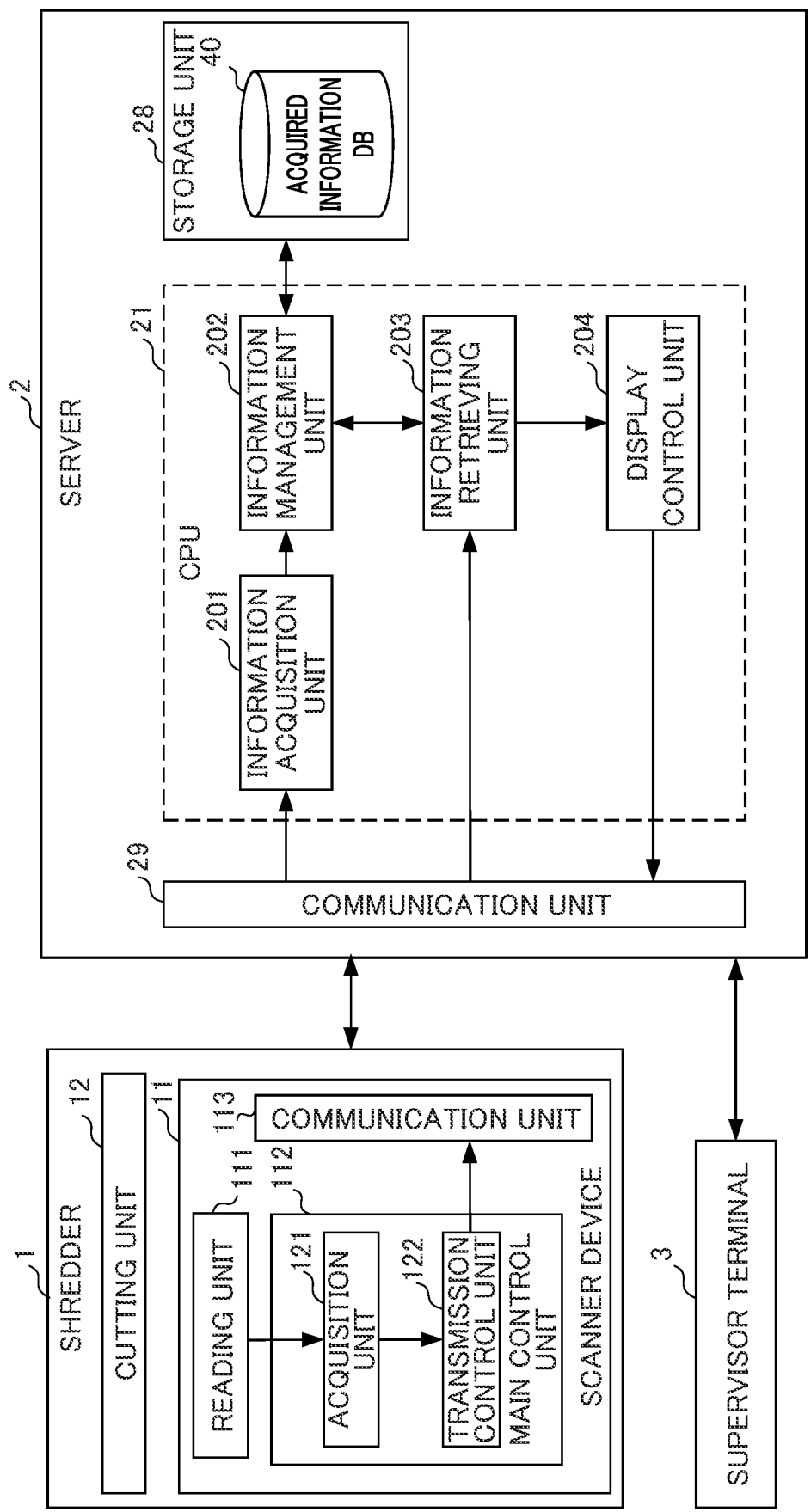
FIG. 5 is a functional block diagram illustrating an example of a functional configuration of the server shown in FIG. 4.

Referring now to FIG. 5, the following describes functional configurations of the shredder 1, the server 2, and the supervisor terminal 3 having the hardware configurations shown in FIGS. 3 and 4. FIG. 5 is a functional block diagram illustrating an example of the functional configuration of the server shown in FIG. 4.

The shredder 1 includes the scanner device 11 and the cutting unit 12. The scanner device 11 of the shredder 1 includes a reading unit 111, a main control unit 112, and a communication unit 113 as functional blocks. The main control unit 112 includes an acquisition unit 121 and a transmission control unit 122.

The CPU 21 of the server 2 includes an information acquisition unit 201, an information management unit 202, an information retrieving unit 203, and a display control unit 204 as functional blocks. An acquired information DB 40 is provided in an area of the storage unit 28 of the server 2.

A series of operations is initiated, for example, by the worker H or someone else feeding a medium P into the feed opening 15 provided in the top panel unit 14 of the shredder 1. Once the medium P has been fed through the feed opening 15 of the shredder 1, the medium P is transferred to the scanner device 11. The reading unit 111 of the scanner device 11 reads information printed or otherwise fixed on the medium P. The acquisition unit 121 of the main control unit 112 acquires the information of the medium P read in the reading unit 111 by converting the information into digital image data. The transmission control unit 122 of the main control unit 112 executes control for transmitting the information of the medium P acquired in the form of digital image data to the server 2 via the communication unit 113. After the information has been read in the reading unit 111 of the scanner device 11, the medium P is sent to the cutting unit 12 of the shredder 1 and shredded.

The information acquisition unit 201 of the server 2 acquires the information (digital image data) transmitted from the shredder 1 via the communication unit 29. The information management unit 202 manages the information acquired by the information acquisition unit 201 by storing, in the acquired information DB 40, the information in a manner such that the information is identifiable as that of the medium P so that the information can be retrieved as information of the medium P.

When the user K wishes to refer to the information of the medium P, the user K gives an information retrieving instruction by accessing the server 2 via the supervisor terminal 3.

Upon receiving the information retrieving instruction from the supervisor terminal 3, the information retrieving unit 203 of the server 2 searches the acquired information DB 40 for the information of the medium P. Specifically, the information retrieving unit 203 obtains the information retrieving instruction sent from the supervisor terminal 3 via the communication unit 29. The information retrieving unit 203 then retrieves the information of the medium P out of the acquired information DB 40 via the information management unit 202.

Note here that the information management unit 202 may store, in the acquired information DB 40, the information of the medium P in association with various metadata. The user K may therefore use metadata as a keyword to give an instruction for retrieving the information of the medium P.

Specifically, in a case where the information of the medium P is about a contract, for example, the shredder 1 may generate metadata "contract" through, for example, character recognition when reading the information of the medium P and output the metadata in association with the information (digital image data) of the medium P. In this case, when the user K wishes to retrieve information about a contract, the user K can enter "contract" as a keyword to smoothly search and extract the information of the medium P associated with the metadata "contract" out of information of various medium P stored in the acquired information DB 40.

In another case, for example, the date when the information of the medium P is read by the shredder 1 is associated with the information of the medium P as metadata. In this case, when the user K wishes to retrieve the information of the medium P retrieved by the shredder 1 on "Xth day of Oth month", the user K can enter "Xth day of Oth month" to smoothly search and extract the information of the medium P associated with the metadata "Xth day of Oth month" out of the information of the various medium P stored in the acquired information DB 40.

The display control unit 204 of the server 2 executes control for displaying the information of the medium P retrieved by the information retrieving unit 203 on the supervisor terminal 3 via the communication unit 29.

The supervisor terminal 3 acquires the information of the medium P through an acquisition unit thereof, not shown, and displays the information on a display thereof, not shown.

In the foregoing, examples of the functional configurations of the shredder 1, the server 2, and the supervisor terminal 3 have been described with reference to FIG. 5.

Second Embodiment

In the shredder 1 according to the first embodiment described above, the scanner device 11 is provided within the housing unit 13 of the shredder 1. Upon a medium P being fed through the feed opening 15, information fixed thereon is read by the scanner device 11 (automatic document feeder), converted into digital image data, and then sent to the server 2. Meanwhile, the medium P is transferred to the cutting unit 12 located under the scanner device 11 and shredded. That is, according to the first embodiment, the reading of the information fixed on the medium P and the shredding of the medium P are performed as a series of processes. As such, the first embodiment only allows for information storage and recovery, and does not prevent physical medium P from being shredded. A second embodiment may therefore have a configuration in which a medium P fed through a feed opening 15 is retained in a predetermined location for a certain period of time after information fixed thereon has been read by a scanner device 11 (automatic document feeder) and before the medium P is transferred to a cutting unit 12. The following describes a specific example of the second embodiment with reference to FIG. 6.

Figure 6:
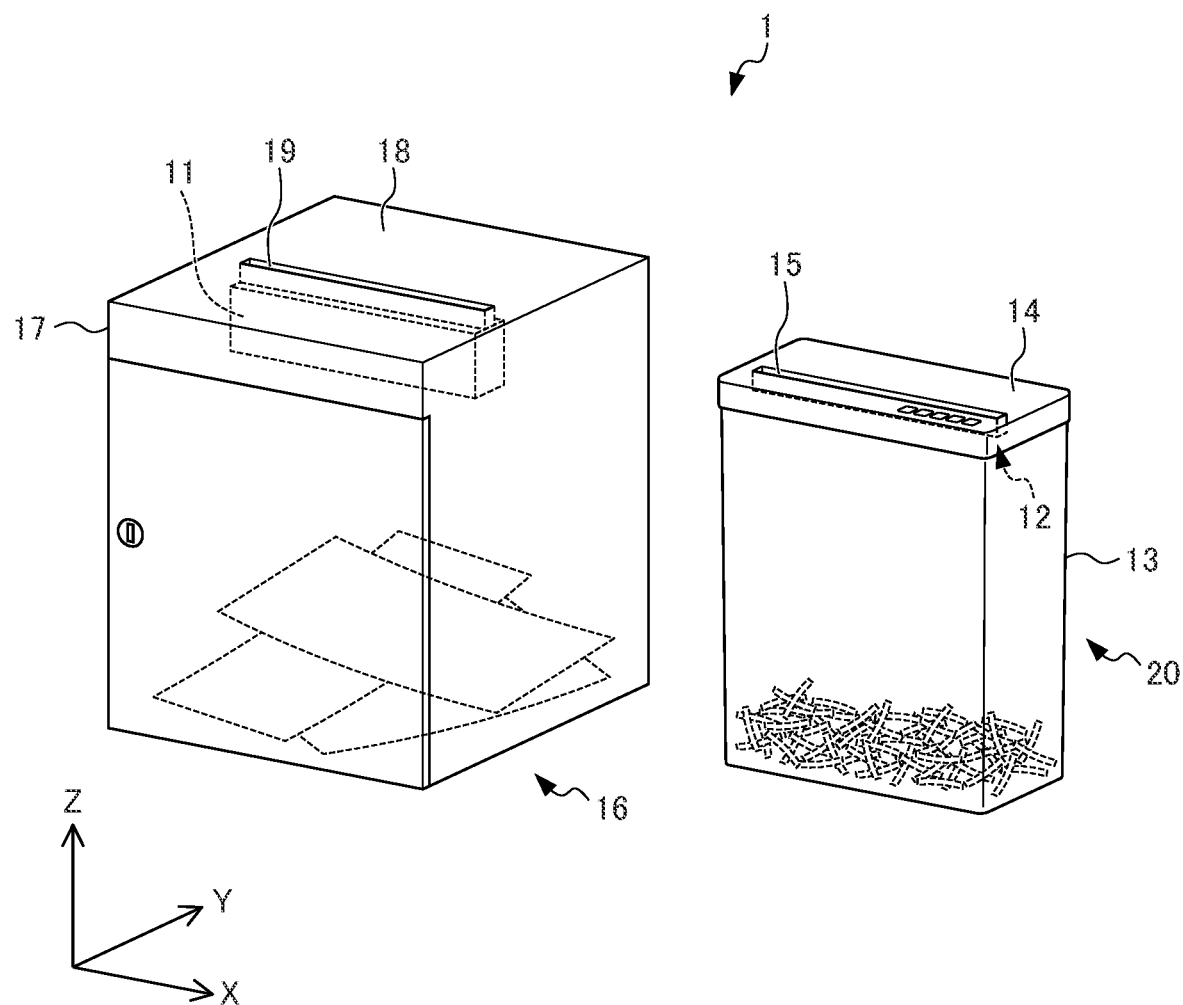
FIG. 6 is a perspective view of an example of an external configuration of a shredder in a system configuration of a shredder system according to an embodiment of the present invention, which differs from FIG. 2.

FIG. 6 is a perspective view of an example of an external configuration of a shredder in a system configuration of a shredder system according to an embodiment of the present invention, which differs from FIG. 2. As shown in FIG. 6, a shredder 1 is placed on a plane (XY plane) formed by an X axis and a Y axis shown in FIG. 6. Accordingly, as described above with reference to FIG. 3, an X axis direction is referred to as a "length direction", a Y axis direction as a "width direction", an upward direction along a Z axis in FIG. 6 as an "up direction", and a downward direction along the Z axis in FIG. 6 as a "down direction".

The shredder 1 according to the second embodiment includes a retention container 16 and a shredding device 20 as shown in FIG. 6. The retention container 16 includes the scanner device 11, a housing unit 17, and a top panel unit 18. The shredding device 20 includes the cutting unit 12, a housing unit 13, and a top panel unit 14. In the retention container 16, the top panel unit 18 is attached to an upper portion of the housing unit 17. The top panel unit 18 has a feed opening 19 for feeding a medium P. The scanner device 11 is provided within the housing unit 17 and is located right under the feed opening 19 in the top panel unit 18. In the shredding device 20, the top panel unit 14 is attached to an upper portion of the housing unit 13. The top panel unit 14 has the feed opening 15 for feeding a medium P. The cutting unit 12 is located under the feed opening 15. The cutting unit 12 shreds a medium P fed through the feed opening 15 with fine blades.

A series of operations is initiated, for example, by the worker H feeding a medium P into the feed opening 19 provided in the top panel unit 14 of the retention container 16. Once the medium P has been fed through the feed opening 19 of the retention container 16, the medium P is transferred to the scanner device 11. A reading unit 111 of the scanner device 11 reads information printed or otherwise fixed on the medium P. An acquisition unit 121 of a main control unit 112 acquires the information of the medium P read in the reading unit 111 by converting the information into digital image data. A transmission control unit 122 of the main control unit 112 executes control for transmitting the information of the medium P acquired in the form of digital image data to a server 2 via a communication unit 113. After the information has been read in the reading unit 111 of the scanner device 11, the medium P is transferred by the automatic document feeder to a retention unit (not shown) provided within the housing unit 17 and retained for a certain period of time.

An information acquisition unit 201 of the server 2 acquires the information (digital image data) transmitted from the retention container 16 via a communication unit 29. An information management unit 202 manages the information acquired by the information acquisition unit 201 by storing, in an acquired information DB 40, the information in a manner such that the information is identifiable as that of the medium P so that the information can be retrieved as information of the medium P.

After being retained for a certain period of time in the retention unit provided within the housing unit 17, the medium P is taken out from the retention unit and fed into the feed opening 15 provided in the shredding device 20. The medium P is then sent to the cutting unit 12 and shredded.

When the user K wishes to refer to the information of the medium P, the user K gives an information retrieving instruction by accessing the server 2 via a supervisor terminal 3.

Upon receiving the information retrieving instruction from the supervisor terminal 3, an information retrieving unit 203 of the server 2 searches the acquired information DB 40 for the information of the medium P. Specifically, the information retrieving unit 203 obtains the information retrieving instruction sent from the supervisor terminal 3 via the communication unit 29. The information retrieving unit 203 then retrieves the information of the medium P out of the acquired information DB 40 via the information management unit 202.

A display control unit 204 of the server 2 executes control for displaying the information of the medium P retrieved by the information retrieving unit 203 on the supervisor terminal 3 via the communication unit 29.

The supervisor terminal 3 acquires the information of the medium P through an acquisition unit thereof, not shown, and displays the information on a display thereof, not shown.

In the foregoing, a specific example of the second embodiment has been described with reference to FIG. 6. As described above, the shredder 1 may have a configuration in which the scanner device 11 and the cutting unit 12 are provided in different housings to give the medium P a certain period of time after the information fixed thereon has been read and before the medium P is shredded. This configuration allows, for example, the user K to retrieve the information of the medium P using the supervisor terminal 3 and determine whether or not it is all right to discard the medium P based on the nature of the medium P while the medium P is retained in the retention container 16 after the information fixed on the medium P has been read. As a result, if the medium P is determined to be treated as do-not-discard, the medium P is taken out from the retention container 16 before being transferred to the shredding device 20, so that the medium P is not shredded. As described above, the configuration that gives the medium P a certain period of time after the information fixed thereon has been read and before the medium P is shredded allows the user K to achieve both recovery of information and recovery of the physical medium P.

In the foregoing, embodiments of the present invention have been described. However, the present invention is not limited to the above-described embodiments, and encompasses changes such as modifications and improvements to the extent that the object of the present invention is achieved.

For example, the hardware configurations shown in FIGS. 3, 4, and 6 are merely examples of configurations for achieving the object of the present invention, and no particular limitations are placed thereon.

For example, in the second embodiment described above, the shredder 1 is described as having a configuration that includes the retention container 16 having a function of reading information fixed on a medium P and the shredding device 20 having a function of shredding the medium P.

However, the configuration of the second embodiment is not limited as such. That is, the retention container 16 and the shredding device 20 may be provided in the same housing.

For another example, in the second embodiment described above, the medium P is transferred to the shredding device 20 after being retained in the retention container 16 for a certain period of time, but no particular limitations are placed on how to transfer the medium P. For example, the medium P may be transferred manually by the user K or someone else, or may be transferred automatically.

The functional block diagram shown in FIG. 5 is merely an example, and no particular limitations are placed thereon. That is, as long as the information processing device has functions for executing the series of processes described above as a whole, functional blocks to be used for implementing such functions are not particularly limited to the example shown in FIG. 5.

Furthermore, the functional blocks are not limited to being in the locations shown in FIG. 5 and may be in any locations. Furthermore, one functional block may be implemented solely by hardware, may be implemented solely by software, or may be implemented by a combination of hardware and software.

In a configuration in which the processes in the respective functional blocks are executed by software, programs that form the software are installed in a device such as a computer via a network or a recording medium. The computer may be any computer incorporated in dedicated hardware. Furthermore, the computer may be, for example, any computer capable of executing various functions through various programs installed therein, such as a server, a general-purpose smartphone, or a general-purpose personal computer.

The recording medium containing the programs may be, for example, any removable medium that is distributed separately from the body of a device in order to provide the programs to each user, or any recording medium that is incorporated in the body of a device in order to be provided to each user along with the device.

The information fixed on the medium P is not particularly limited to being outputted as digital image data as in the foregoing embodiments. That is, the information of the medium P may be outputted as text data rather than image data. In this case, the user K may use at least a portion of the text data as a keyword to give an instruction for retrieving the information of the medium P. Specifically, for example, when the user K wishes to retrieve contract-related information, the user K enters "contract" as a keyword. As a result, information of any medium P containing the keyword "contract" is found and extracted out of information of various medium P stored in the acquired information DB 40. This configuration, in which information of each medium P is outputted as text data, advantageously enables information of a medium P associated with a certain keyword to be smoothly found and extracted.

However, text data is also disadvantageous in that information therein can be easily rewritten. Specifically, for example, a non-related party with a fraudulent purpose can easily rewrite information about a contract with a client outputted as text data and output the information by fixing the information onto another medium. As described above, the configuration in which information of each medium P is outputted as text data is advantageous in that information can be easily found and extracted, but is also disadvantageous in that the information can be easily rewritten.

In this respect, digital image data is advantageous in that information included therein tends to be relatively difficult to modify, and thus the information is less editable. In a situation in which information fixed on a medium P is, for example, about a contract with a client, and is so important that editing thereof is impermissible, therefore, the information fixed on the medium P is more admissible as evidence and more preferable if the information is outputted as digital image data than if the information is outputted as text data.

In other words, the shredder system to which the present invention is applied may take various different embodiments as long as the shredder system has the following configuration. That is, a shredder system according to an aspect of the present invention includes:

an information processing device (for example, the server 2 in FIG. 2);

a shredder (for example, the shredder 1 in FIG. 3) configured to shred a medium (for example, the medium P in FIG. 3) having information fixed thereon; and a scanner device (for example, the scanner device 11 in FIG. 3), the scanner device (for example, the scanner device 11 in FIG. 3) being configured to read the information fixed on the medium (for example, the medium P in FIG. 3) at a predetermined time before the medium is shredded by the shredder (for example, the shredder 1 in FIG. 3), the information processing device including an information acquisition section (for example, the information acquisition unit 201 in FIG. 5) configured to acquire the information read by the scanner device (for example, the scanner device 11 in FIG. 3) and an information management section (for example, the information management unit 202 in FIG. 5) configured to manage the information acquired by the information acquisition section (for example, the information acquisition unit 201 in FIG. 5) in a recoverable manner. According to this configuration, the information fixed on the medium (for example, the medium P in FIG. 3) is read by the scanner device (for example, the scanner device 11 in FIG. 3) at a predetermined time before the medium (for example, the medium P in FIG. 3) is shredded by the shredder (for example, the shredder 1 in FIG. 3), and then is acquired by the information acquisition section (for example, the information acquisition unit 201 in FIG. 5) of the information processing device and managed in a recoverable manner by the information management section (for example, the information management unit 202 in FIG. 5). That is, this configuration makes it possible to prevent information destruction, because the information fixed on the medium is acquired before the medium is shredded and managed in a recoverable manner.

The information acquisition section (for example, the information acquisition unit 201 in FIG. 5) acquires the information as image information. Since the information fixed on the medium (for example, the medium P in FIG. 3) is acquired as image information, this configuration makes it possible to prevent the information from being altered. That is, this configuration helps increase the reliability of the information.

Furthermore, the information processing device further includes a provision section (for example, the information retrieving unit 203 in FIG. 5) configured to recover and provide the information. According to this configuration, the provision section (for example, the information retrieving unit 203 in FIG. 5) recovers and provides the information fixed on the medium (for example, the medium P in FIG. 3).

That is, this configuration makes it possible to recover information fixed on a medium that has been fed into a shredder.

EXPLANATION OF REFERENCE NUMERALS

1: Shredder
2: Server
3: Supervisor terminal
201: Information acquisition unit
202: Information management unit
203: Information retrieving unit
204: Display control unit

The invention claimed is:

1. A shredder system comprising:
a server;
a retention container configured to retain a medium comprising information fixed thereon in response to a first person feeding the medium to the retention container;
a shredder configured to shred the medium;
a scanner device; and
a supervisor terminal that is used to retrieve information of the medium,
wherein the server, the shredder, and the supervisor terminal are connected over a predetermined network,
wherein the scanner device is provided within the retention container in a state where the first person is unable to visually recognize the scanner device, and
wherein the scanner device is configured to read the information fixed on the medium at a predetermined time before the medium is shredded by the shredder, and
wherein the supervisor terminal transmits an information retrieving instruction to the server over the predetermined network in response to a first input by a second person at the supervisor terminal that is different from the first person,
wherein the server comprises:
an information acquisition unit configured to acquire the information read by the scanner device over the predetermined network,
an information management unit configured to manage the information of the medium acquired by the information acquisition unit in a recoverable manner, and
a display control unit that, in response to receiving the information retrieving instruction from the supervisor terminal, retrieves the information of the medium managed by the information management unit and executes control to display the information on the supervisor terminal,
wherein the information management unit manages the information of the medium in association with metadata generated for search, the metadata comprising character recognition information of a part of the medium and a date, and
wherein, during the period in which the medium is retained in the retention container, the server determines whether to shred the medium based on a second input to the supervisor terminal, and
wherein the shredder automatically shreds the medium in response to the second input confirming shredding of the medium.

2. The shredder system according to claim 1,
wherein the information acquisition unit acquires the information as image information.

3. The shredder system according to claim 1,
wherein the server further comprises an information retrieving unit configured to recover and provide the information of the medium.

* * * * *